United States Patent [19]

Daines

[11] Patent Number: 4,463,894
[45] Date of Patent: Aug. 7, 1984

[54] METHOD AND MOLD FOR MAKING AN IMPROVED EGG CARTON

[75] Inventor: John Daines, Rushville, N.Y.

[73] Assignee: Mobil Oil Corporation, New York, N.Y.

[21] Appl. No.: 531,186

[22] Filed: Sep. 12, 1983

Related U.S. Application Data

[63] Continuation of Ser. No. 299,683, Sep. 8, 1981, abandoned.

[51] Int. Cl.³ .......................... B65D 5/66; B65D 1/24
[52] U.S. Cl. .......................... 229/44 EC; 229/2.5 EC; 229/45 EC
[58] Field of Search ........ 229/2.5 EC, 44 EC, 45 EC

[56] References Cited

U.S. PATENT DOCUMENTS

| | | | |
|---|---|---|---|
| 2,990,094 | 6/1961 | Reifers . | |
| 3,215,326 | 11/1965 | Despres | 229/45 EC |
| 3,215,327 | 11/1965 | Crabtree | 229/2.5 EC |
| 3,259,294 | 7/1966 | Hartmann | 229/45 EC |
| 3,398,875 | 8/1968 | Snow | 229/44 EC |
| 3,458,108 | 7/1969 | Hawarth | 229/45 EC |
| 3,648,916 | 3/1972 | Commisso . | |
| 3,687,355 | 8/1972 | Dahlberg | 229/45 EC |
| 3,845,187 | 9/1972 | Dahlberg . | |
| 3,862,817 | 1/1975 | Dahlberg . | |
| 4,108,941 | 8/1978 | Kermoian . | |
| 4,142,848 | 3/1979 | Irwin . | |
| 4,143,111 | 3/1979 | Irwin . | |
| 4,194,682 | 3/1980 | Congleton | 229/2.5 EC |

FOREIGN PATENT DOCUMENTS 2032888 5/1980 United Kingdom .......... 229/44 EC Primary Examiner—Herbert F. Ross
Attorney, Agent, or Firm—Alexander J. McKillop; Michael G. Gilman; Charles J. Speciale

[57] ABSTRACT

An inwardly offset surface of the cover of a carton is cut in a plane transverse to the top of the cover. A protrusion on the bottom surface of a complementary recess in the latch flap extends through the hole to latch the carton with the protrusion being within the cover recess to prevent accidental opening of the carton. The mold for producing the carton cuts the hole while thermoforming by relative movement between a male key mounted in the male mold member and female key mounted in the female mold member. Both keys have flat surfaces transverse to the closing motion of the molds. These flat surfaces are biased into engagement one with the other so that the plastic is cut in a shearing action.

3 Claims, 13 Drawing Figures

FIG. 3
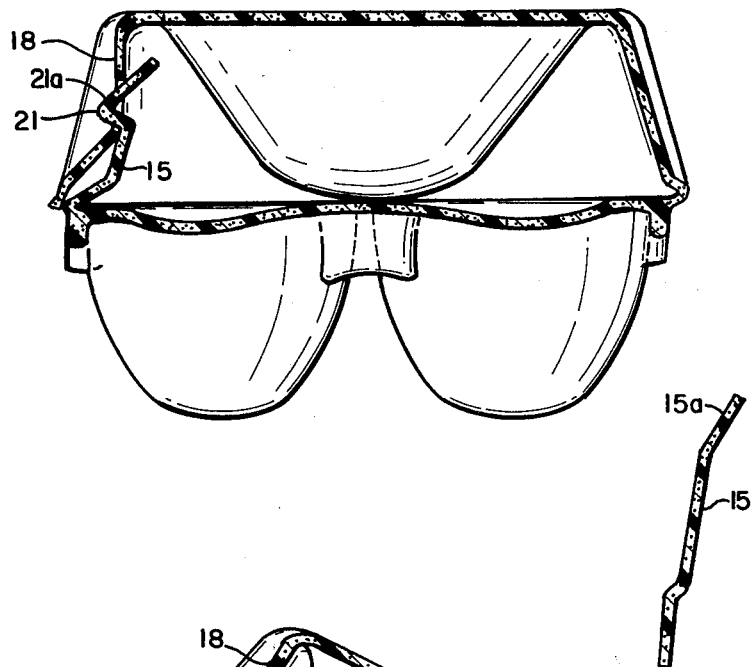
FIG. 4
FIG. 4A
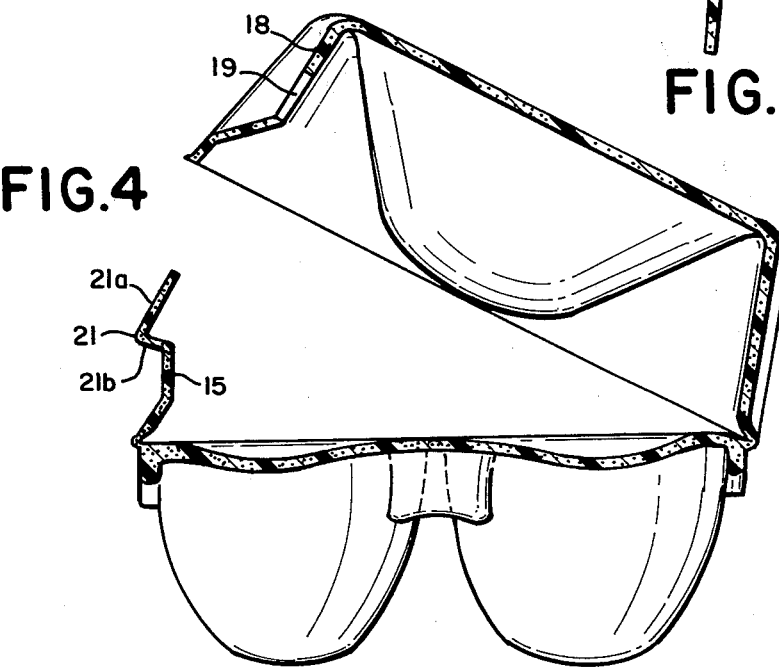

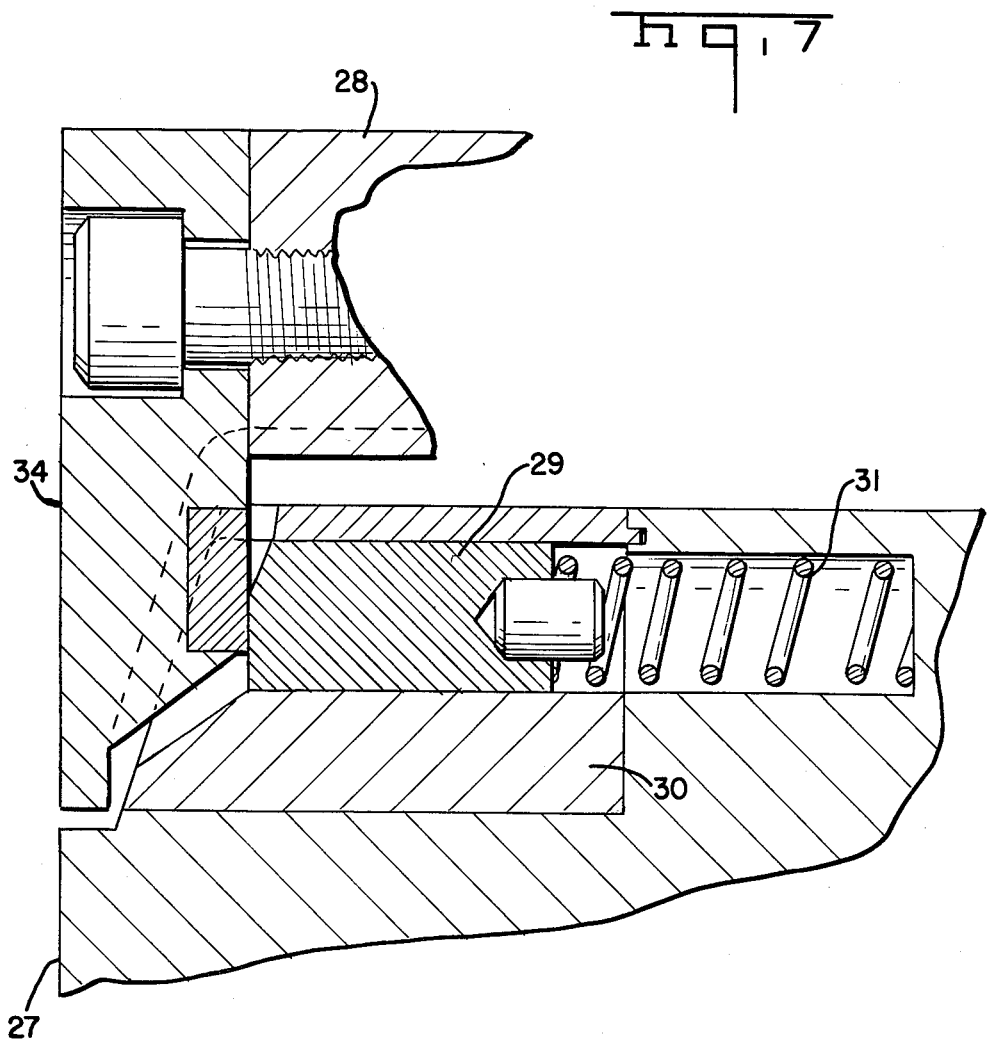

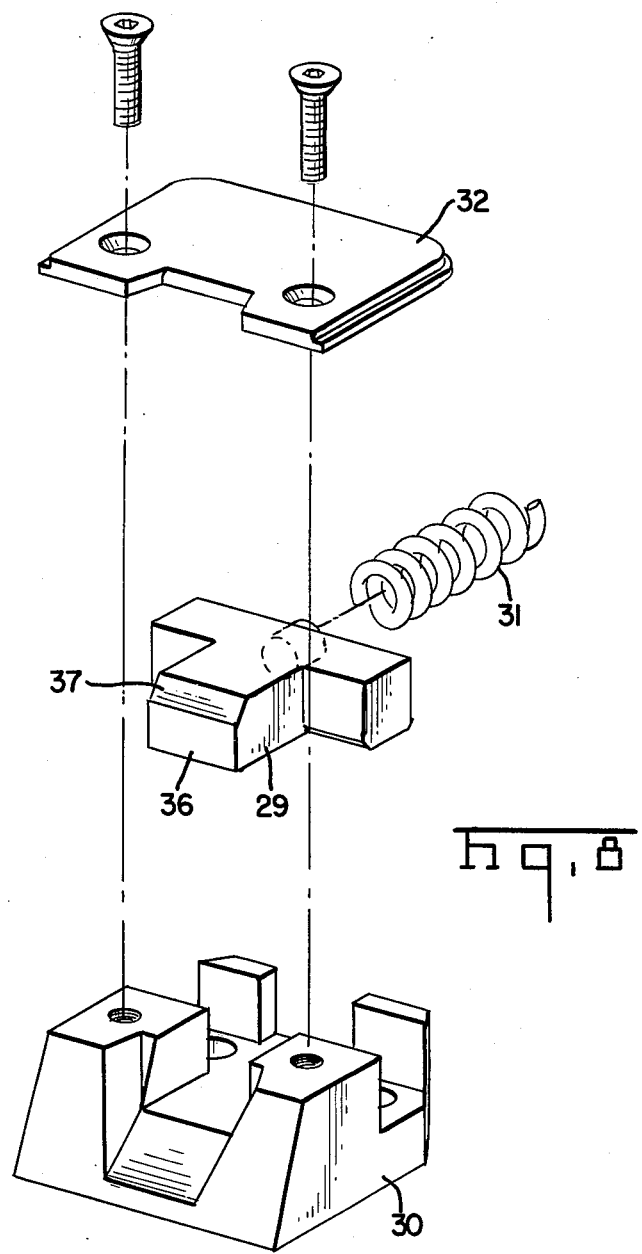

METHOD AND MOLD FOR MAKING AN IMPROVED EGG CARTON

This is a continuation of copending application Ser. No. 299,683, filed on Sept. 8, 1981 abandoned.

BACKGROUND OF THE INVENTION

This invention relates to an improved egg carton, and to methods of and molds for making it.

U.S. Pat. No. 2,990,094 shows an egg carton with a latch of the type in which a "button" on the latch flap extends through a hole in the flat surface of the cover to latch the carton closed. Problems were experienced with this type of egg carton because persons picking the carton up by the cover inadvertently pushed the protrusion out of engagement with the hole, thereby unlatching the egg carton with disastrous results.

Cartons of the type shown in U.S. Pat. No. 3,648,917—Commisso obviate this problem. The latch flap has a locking recess which includes a latch bar across the top thereof. The cover has recesses which are complementary to the recess on the latch flap. A hole is cut across the recess in the cover. This hole extends from the flat surface of the front of the cover down into the recess, across the recess, and back to the front surface of the cover. In the closed position, the latching bar fits into this hole to hold the cover in the closed position. This latching mechanism has the advantage that it is recessed. Therefore, when the carton is grasped by the cover, there is no possibility of inadvertently unlatching the cover.

Egg cartons of this type are thermoformed from a sheet of preheated polystyrene foam. In egg cartons of the type shown in the Commisso patent, it is important that the hole in the cover extend all the way from the front surface of the cover to the bottom of the recess, and back to the front surface. Only when the hole is completely extended in this manner, will the latching bar fit into the hole to lock the carton. Because of this, cartons of the type shown in the Commisso patent have heretofore been formed in two steps. The first step is the thermoforming operation in which two mold members close to form the carton. The second step is a punching operation which punches the hole in the cover. It is desirable to eliminate the separate punching step so that the carton is formed with a hole in the cover during the molding operation.

U.S. Pat. Nos. 3,845,187 and 3,862,817 Dahlberg describe a thermoforming method and molds for cutting a hole in the carton at the same time that the carton is formed. An attempt is made to tear the edges of the hole to form the portion of the hole between the cover and the bottom of the recess so that the latching bar will mate with the edge of the hole. Tearing plastic material is unpredictable and results in many cartons with inoperable locks. Furthermore, a torn edge on the hole is unsightly.

A more desirable hole is formed by the process and molds shown in U.S. Pat. No. 4,108,941—Kermoian, U.S. Pat. No. 4,182,848—Irwin and U.S. Pat. No. 4,143,111—Irwin. As shown in these patents, dies in the male and female mold members shear the plastic during the closing of the molds to cut a hole in the cover.

It is an object of the present invention to cut a hole in the bottom of a recess in the cover of a carton during molding to form a recessed latch which will not be inadvertently unlocked.

SUMMARY OF THE INVENTION

In accordance with the present invention, an egg carton has a hole cut in an inwardly offset surface of a recess in the front wall of a cover, which cut is in a plane perpendicular to the top of the cover. A protrusion on the bottom surface of the recess in the latch flap extends through a complementary hole in the inwardly offset surface of the cover to latch the carton in the closed position. The carton has the advantage of a recessed latch which is not easily opened accidentally. It has the further advantage of allowing the cutting of the hole in the cover during the molding of the carton. This eliminates tearing of the cover or the requirement of a separate step for punching out the portion of the cover between the inwardly offset surface and the front surface of the cover.

In accordance with another aspect of the invention, the latch flap has a sloping surface, between the protrusion and the free edge, angled at the same angle as the beveled edge of the latch flap to aid in closing. The protrusion terminates in a sharp undercut which provides good closure strength, but the carton is easier to open. The invention is carried out by closing a male mold member and female mold member on a preheated flat sheet of polystyrene foam to produce a carton having a cover and a latch flap. A male cutting key mounted on the male mold member has a cutting surface parallel to the closing motion between the male and female mold members. A female cutting key is mounted in the female mold member and has a flat cutting surface which is also parallel to the closing motion between the male and female mold members. The cutting keys on the male and female mold members are biased one against the other during the closing motion of the mold members. The flat surfaces of the cutting keys shear a hole in the cover transverse to the top of the cover during closing of the mold members. The mold has the advantage of not requiring precise alignment of the male and female mold members. Therefore, the cartons of the present invention can be produced on existing molds, which frequently do not have close fitting tolerances, by merely fitting the molds with the male and female cutting keys of the present invention. Upon closure of the mold members, the female cutting key engages a beveled edge on the male cutting key. The engagement moves the male cutting key against the bias in a motion transverse to the closing motion. Therefore, good registration between the flat cutting surfaces of the cutting keys is obtained regardless of the closing tolerance between the male and female mold members.

The foregoing and other objects, features and advantages of the invention will be better understood from the following more detailed description and appended claims.

SHORT DESCRIPTION OF THE DRAWINGS

FIGS. 3 and 4 are sectional views of the carton in the closed and open position respectively;

FIG. 4A is a partial sectional view similar to FIG. 4, except that it is a section through the beveled edge of the latch flap instead of through the protrusion on the latch flap;

FIG. 7 is similar to FIG. 6 with the mold members closed;

FIG. 8 shows the male key and male key holder;

DESCRIPTION OF THE PREFERRED EMBODIMENT

Figure 1:
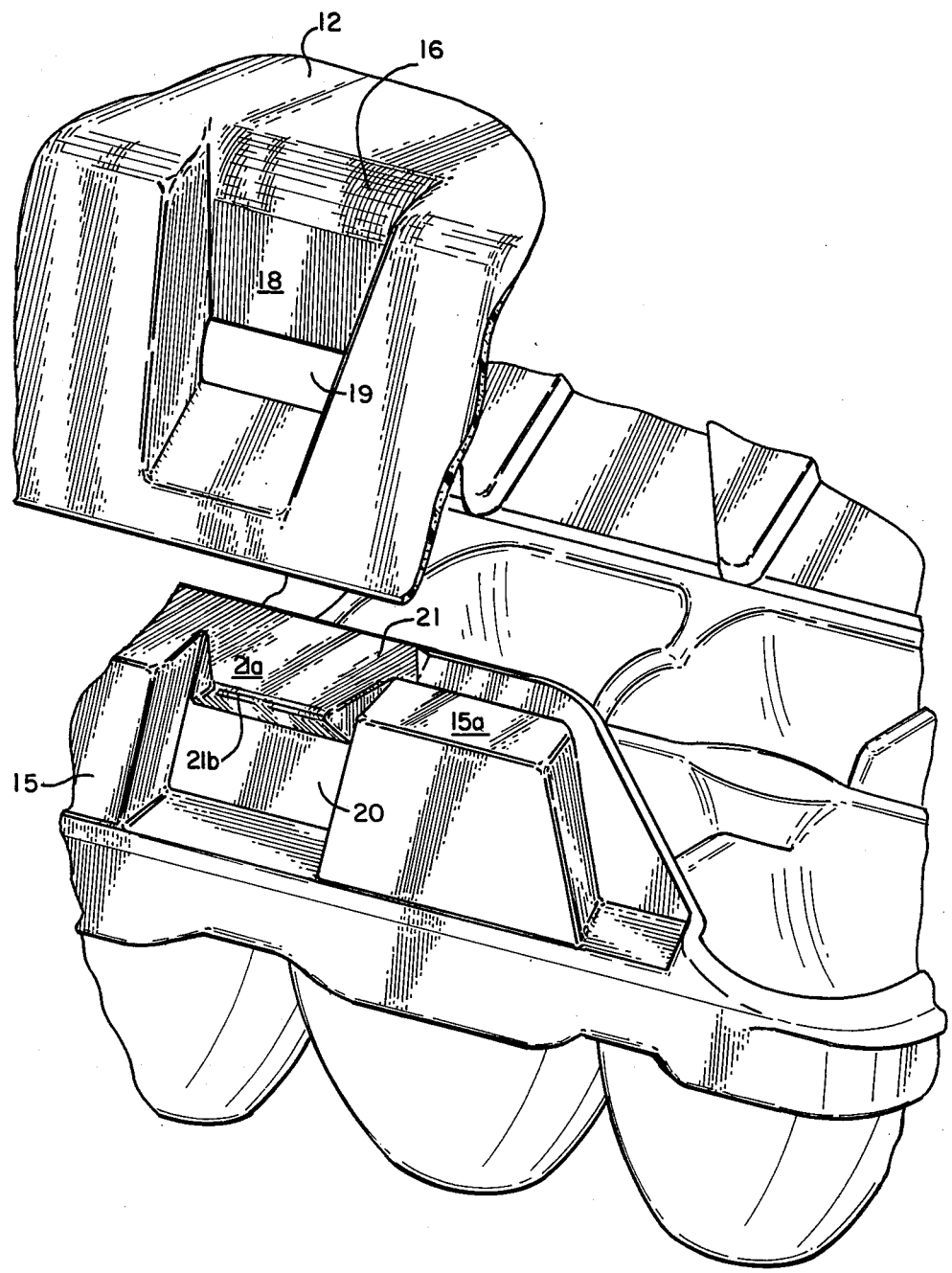
FIG. 1 shows a portion of the latch flap and the cover which has the latch of the present invention.
Figure 2:
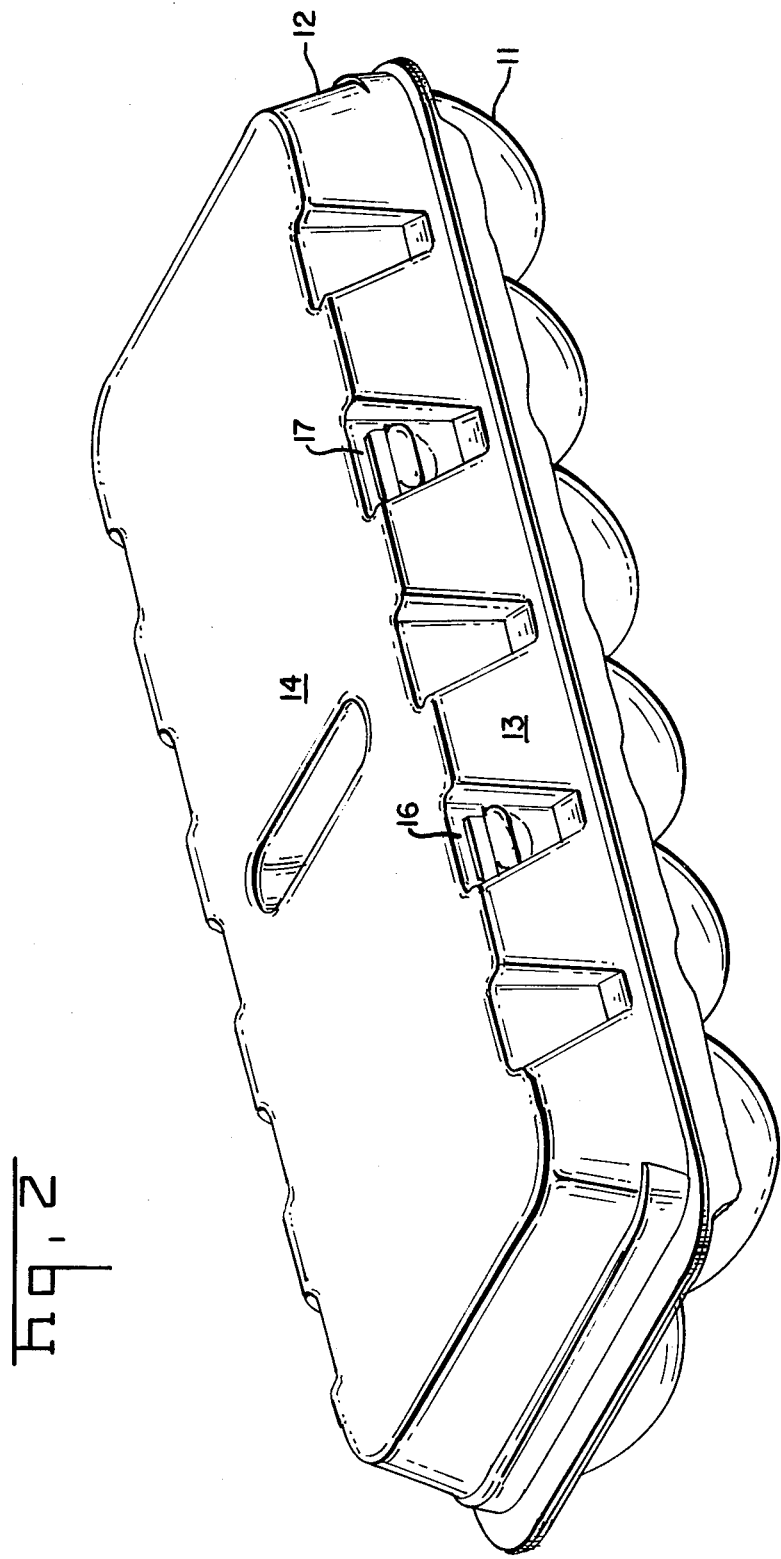
FIG. 2 is a view of the carton in the closed position.

Referring to FIGS. 1-4, the egg carton of the present invention includes a bottom tray 11 formed to define a plurality of cells for receiving eggs. A dished cover 12 is resiliently hinged to the rear upper edge of the tray. It has a front wall 13, a top 14, a back wall and end walls fixed to the top. The front wall 13 slopes in a plane inwardly toward the top. A latching flap 15 is resiliently hinged to the front upper edge of the tray 11 and with a bias of the flap toward an outward position. Recesses 16 and 17 in the front wall of the cover have a surface 18 which is inwardly offset with respect to the front wall. A hole 19 in this surface is cut in a plane which is perpendicular to the top 14 of the cover. A recess 20 in the latch flap 15 complements the recess 16 in the front wall of the cover. A protrusion 21 on the bottom surface of the recess 20 extend through the complementary hole 19 in the inwardly offset surface of the cover. This latches the carton when it is in the closed position as shown in FIG. 3. The carton of the present invention has the advantage that when in closed position, the protrusion 21 is within the confines of the recess 16 so that it cannot be inadvertently unlatched by grasping the cover of the carton.

The structure of the protrusion 21 is an improvement over the button type latches shown in the aforementioned '094 patent. The protrusion 21 has a sloping surface 21a which is angled at the same angle as the beveled surface 15a on the latch flap 15, as can best be seen by comparing FIG. 4, which is a section through sloping surface 21a with FIG. 4A which is a section through beveled surface 15a. The sloping surface 21a terminates in a sharp undercut which forms the latching 21b surface.

Figure 5B:
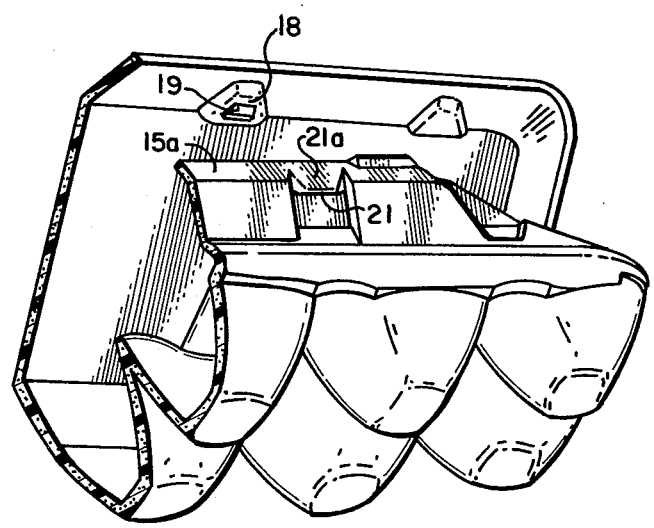
FIG. 5B is a comparable view of the carton of the present invention.
Figure 5A:
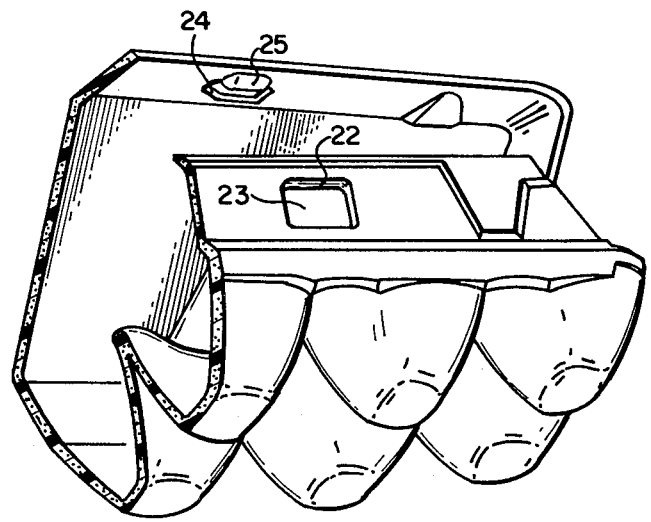
FIG. 5A shows a carton of the type shown in the aforementioned Commisso patent.
Figure 6:
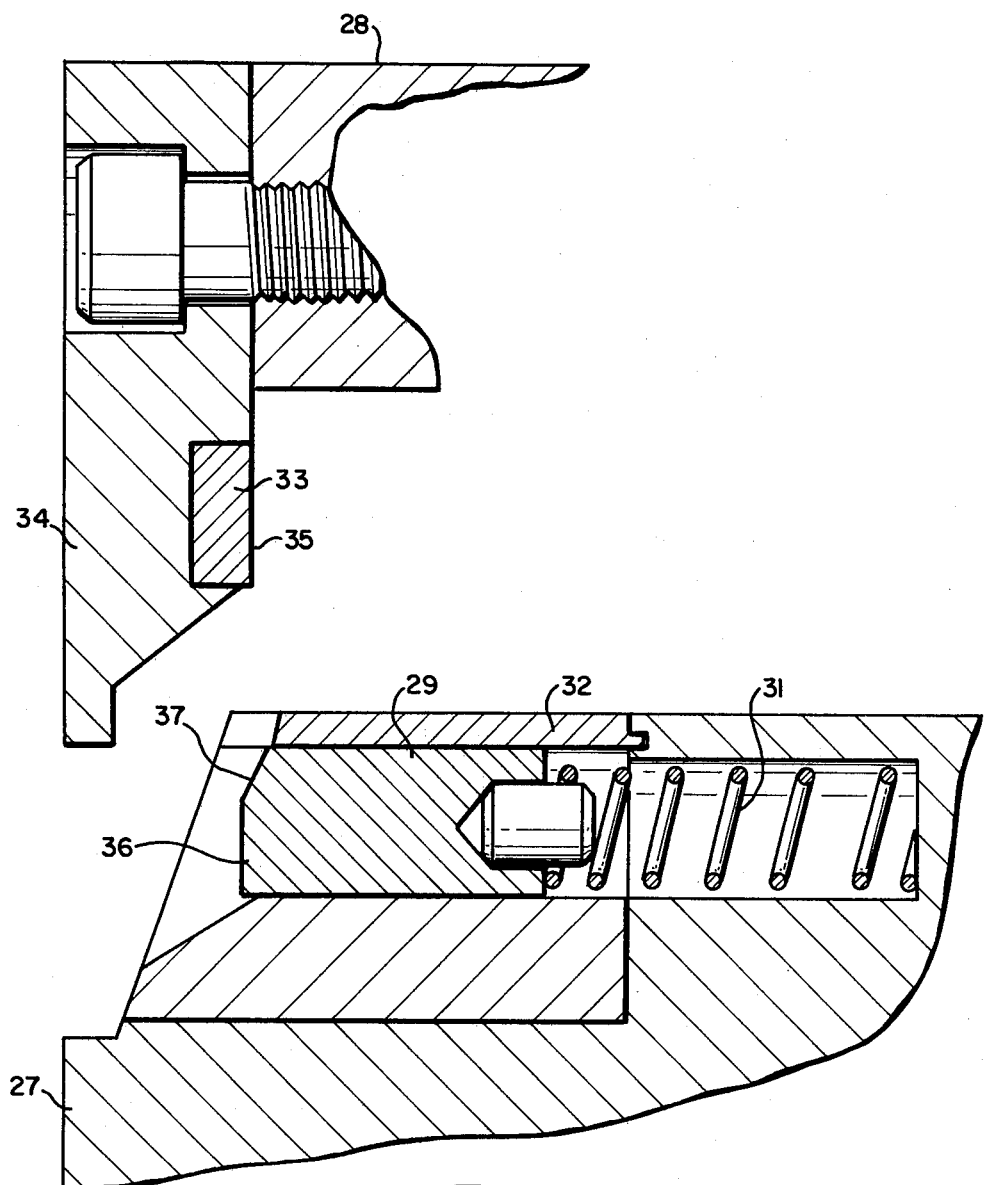
FIG. 6 is a partial cross-section through the male and female mold members which are in the open position.
Figure 9A:
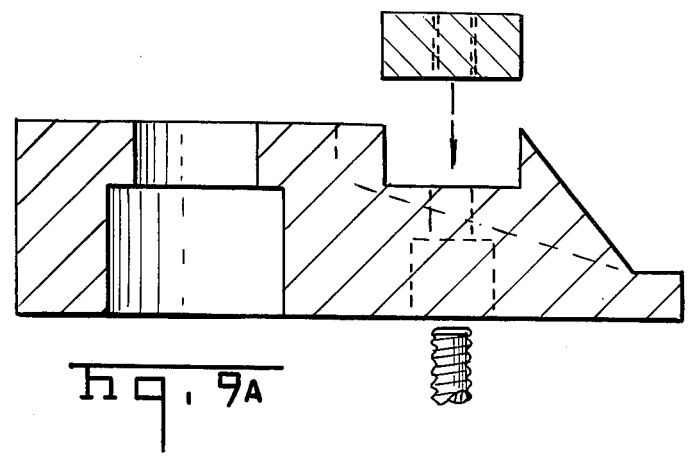
FIG. 9A is a section on the lines A—A of FIG. 9.
Figure 9:
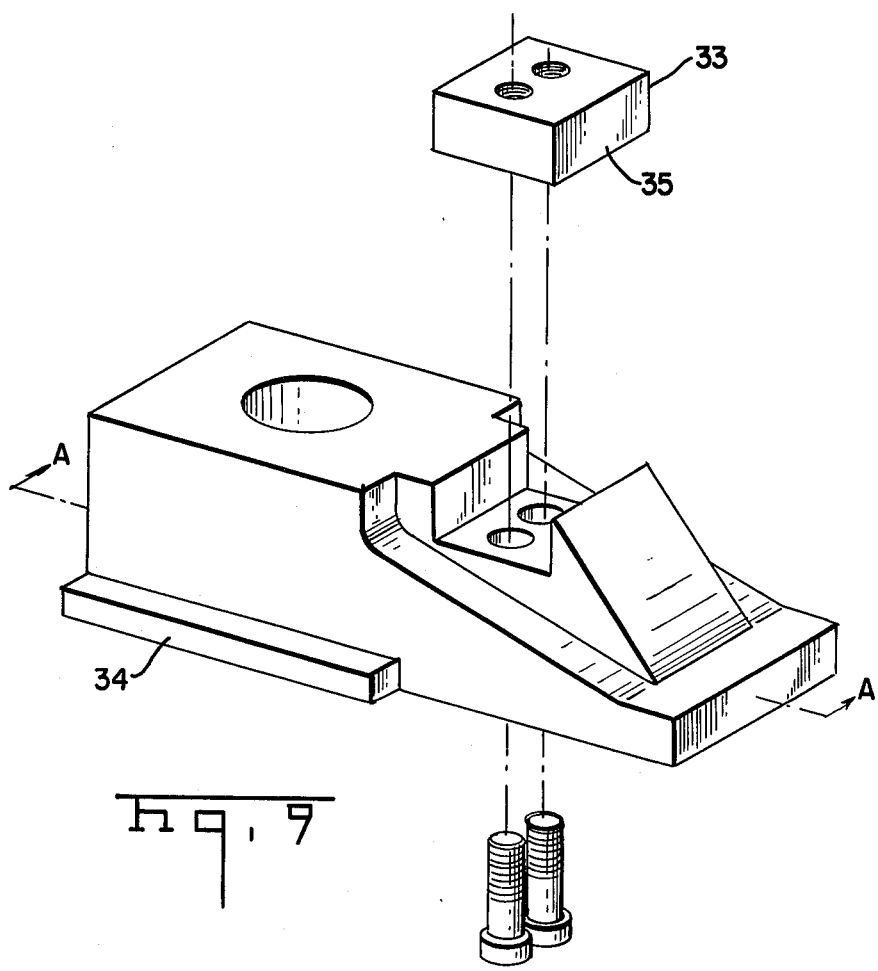
FIG. 9 shows the female key and female key holder.
Figure 10:
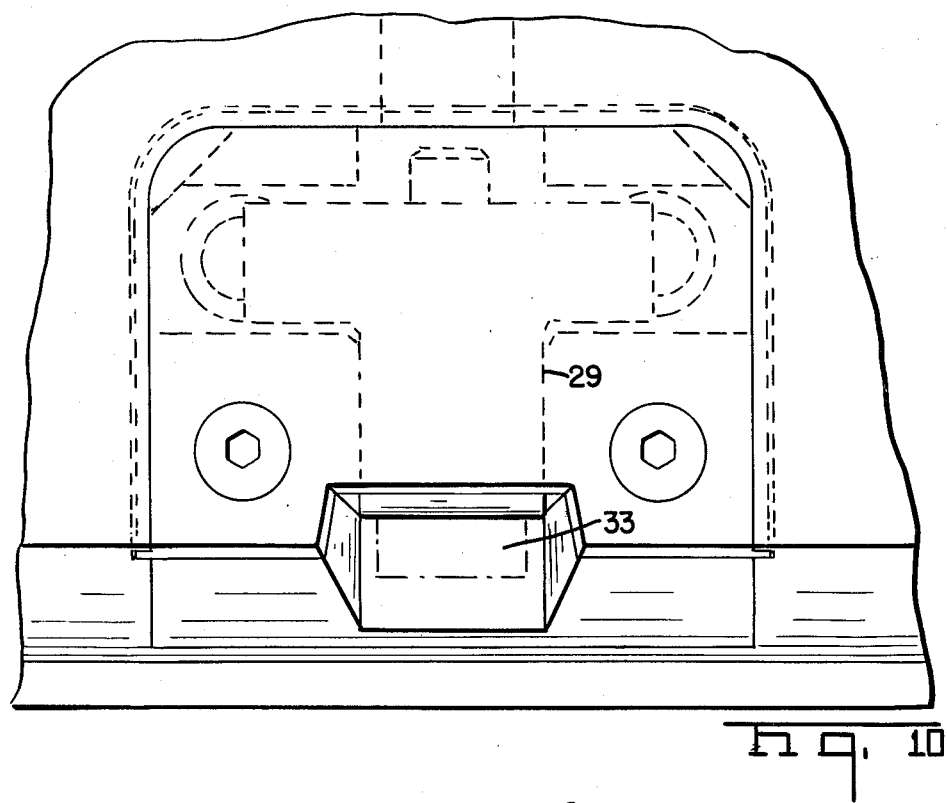
FIG. 10 is a top view of the male mold member showing the outline of the male key holder.
Figure 11:
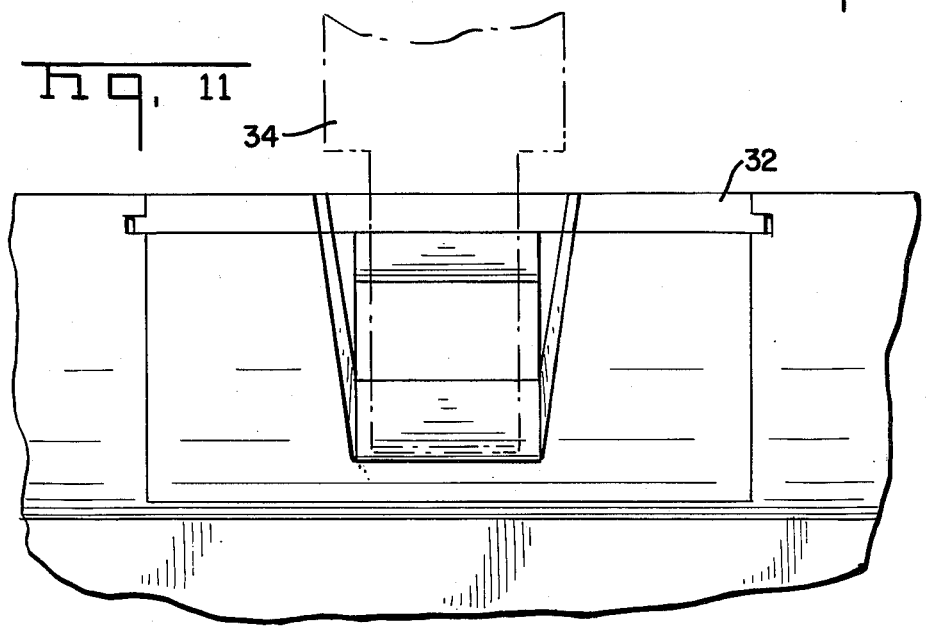
FIG. 11 is a side view of the male mold member.

The advantages of the present invention over the carton of the Commisso patent are best demonstrated by comparing FIGS. 5A and 5B. In FIG. 5A a latch bar 22 at the top of the walled recess 23 in the latch flap forms the male locking member. The hole 24 in the cover is cut from the front surface of the cover to the back to the inwardly offset surface 25, and then back to the front surface. Only if the hole is cut completely to the front surface of the cover, will the latch bar 22 fit through the hole to provide a positive engagement. On the other hand, the hole 19 in the cover of the carton of the present invention is flush with the inwardly offset surface 18. This hole can be simply sheared during the molding of the egg carton. Good latching is obtained with this type of hole by reason of the protrusion 21 extending through the hole 19.

Referring to FIGS. 6-12, the mold forming this egg carton includes a male mold member 27 and a female mold member 28. These members are closed one with respect to the other on a preheated flat sheet of polystyrene foam to form a carton cover, the outline of which is shown in FIG. 7.

A male cutting key 29 is mounted in a male key holder 30 which is in turn mounted in the male mold member 27. The male cutting key 29 is biased toward the left by the spring 31. A cover 32 (FIG. 8) for the male cutting key 29 ensures that it moves only in a direction perpendicular to the closing motion of the mold members.

A female key 33 is mounted in a female key holder 34 which is in turn mounted on the female mold member 28. The female cutting key has a flat cutting surface 35 which is parallel to the closing motion of the mold members. The male cutting key 29 has a mating flat cutting surface 36 parallel to the closing motion of the mold members. The male key has a beveled edge 37 along the surface which first engages the female key during closing motion between the male and female mold members. The engagement of the female key 33 with the beveled edge 37 produces a motion of the male key toward the right (FIG. 6) against the bias of the spring and perpendicular to the closing motion between the male and female mold members. This perpendicular motion is sufficient to ensure complete engagement between the flat surfaces 35 and 36 of the male and female cutting keys during further closing motion of the mold members. The bias between these flat surfaces ensures a good shearing action in a classic scissor-like motion in which the two cutting surfaces are biased oblique to one another. The beveled edge and bias also ensure that this action will be present regardless of the alignment between the male and female mold members.

While a particular embodiment has been shown and described, modifications are within the true spirit and scope of the invention. The appended claims are, therefore, intended to cover all such modifications.

What is claimed is:

1. A carton adapted for the packaging of eggs and the like comprising:
    a bottom tray formed to define a plurality of cells for reception of eggs and of a depth such that said eggs are enclosed thereby for a portion less than their vertical dimension as packaged;
    a dished cover resiliently hinged to the rear upper edge of said tray and having a front wall, a back wall, and end walls fixed to each other and to a top for said cover, all of such dimensions situated so that said eggs are substantially enclosed within the edges of said tray, said front wall lying primarily in a plane sloping inwardly toward said top;
    a latching flap hinged to the front upper edge of said tray front wall, said flap hinge biasing said flap toward an outward position;
    a plurality of recesses in said front wall of said cover each having a surface which is inwardly offset with respect to said front wall and lying in a plane sloping upwardly toward said top; said recess having a hole in said surface cut in a plane that extends perpendicular to the plane of the top of said cover, said hole being substantially flush with said surface which is inwardly offset with respect to said front wall;
    a plurality of recesses in said latching flap complementary to the recesses in said front wall of said cover;
    a plurality of protrusions at the free edge of said matching flap opposite said flap hinge, each protrusion extending through a complementary one of the holes in the inwardly offset surface of said cover to latch said carton in the closed position, said protrusion terminating in a sharp undercut for latching engagement with a complementary one of said holes; and said latching flap having a beveled surface at said free edge thereof, and a sloping surface between said undercut and said free edge angled at the same angle as the beveled surface of said latching flap and lying entirely in the same plane as said beveled surface for aiding in closing said carton.

2. The carton recited in claim 1 wherein said protrusion extends through a hole which is approximately centered within the confines of the recess in said cover to prevent inadvertent disengagement of said protrusion from said hole.

3. A carton adapted for the packaging of eggs and the like comprising:

a bottom tray formed to define a plurality of cells for reception of eggs and of a depth such that said eggs are enclosed thereby for a portion less than their vertical dimension as packaged;

a dished cover resiliently hinged to the rear upper edge of said tray and having a front wall, a back wall, and end walls fixed to each other and to a top for said cover, all of such dimensions situated so that said eggs are substantially enclosed within the edges of said tray, said front wall lying primarily in a plane sloping inwardly toward said top;

a latching flap hinged to the front upper edge of said tray front wall, said flap hinge biasing said flap toward an outward position;

a plurality of recesses in said front wall of said cover each having a surface which is inwardly offset with respect to said front wall and lying in a plane sloping upwardly toward said top; said recess having a hole in said surface;

a plurality of recesses in said latching flap complementary to the recesses in said front wall of said cover;

a plurality of protrusions at the free edge of said latching flap opposite said flap hinge, each protrusion extending through a complementary one of the holes in the inwardly offset surface of said cover to latch said carton in the closed position, said protrusion terminating in a sharp undercut for latching engagement with a complementary one of said holes; and said latching flap having a beveled surface at said free edge thereof, and a sloping surface between said undercut and said free edge angled at the same angle as the beveled surface of said latching flap and lying entirely in the same plane as said beveled surface for aiding in closing said carton.

* * * * *